INVENTOR.
MASAO TAKAGI
BY
Reynolds & Christensen
ATTORNEYS

United States Patent Office 3,207,151
Patented Sept. 21, 1965

3,207,151
INSTRUMENT FOR LOCATING PARTICULAR CUTANEOUS POINTS CAUSED BY VISCEROVASCULAR REFLEX
Masao Takagi, Ukyo-ku, Kyoto, Japan, assignor to Tateisi Denki Kabushikikaisha, Ukyo-ku, Kyoto, Japan, a corporation of Japan
Filed Sept. 17, 1962, Ser. No. 224,110
Claims priority, application Japan, Sept. 27, 1961, 36/34,962
6 Claims. (Cl. 128—2.1)

This invention relates to an instrument for detecting or locating particular, minute points on the skin of a subject at which the electrical properties differ from electrical properties of the subject's skin in normal areas thereon. While the invention is herein illustratively described in terms of a preferred form thereof, it will be recognized that certain modifications may be made therein with respect to details without departing from the essential features involved.

The purpose of this invention is to provide an instrument capable of detecting very minute points on the human skin at which the electrical properties differ, particularly with respect to both resistance and capacitance, from the normal electrical properties of the skin. While it is not the purpose hereof to teach or suggest the different possible uses in medical science of electrical examination of the skin (electrodermatography) and no implied imprimatur of the U.S. Government as to the diagnostic efficacy of any medical technique relating to its use is to be inferred from any statement made herein, the following example is given as illustrative of the use of this invention.

It has been found useful in certain branches of medical practice to examine the electrical properties of the skin from point to point, noting the locations of points at which the electrical properties differ from those of others and the extent of such differences. At an "electrodermic point" there is a small but electrically detectable difference in the impedance of the skin from its normal impedance, manifested by lower resistance and higher capacitance.

The electrodermic points have a maximum of 0.5 mm. diameter and cannot be macroscopically distinguished. In the prior art various attempts have been made to provide means for electrically detecting electrodermic points, wherein direct current is applied to the skin to measure the resistance thereof.

Electrophysiologically, the resistance of the normal horny cutaneous layer is of the order of megohms, almost reaching the state of insulation, partly because of the presence of polarizations in the cells, while that of electrodermic points is about 50 to 500 kilohms. Therefore, searching the skin surface for points of lower resistance may be a good way of locating electroderimc points. However, as is well known, when direct current is passed through the living body, polarization occurs, and the higher the polarization potential is, the higher the resistance of the skin becomes. Therefore, the value of resistance of a certain cutaneous point measured simply by an ammeter will be affected by the polarization potential thereupon, with the resulting impossibility of measuring the true resistance of a living body. Even though a point of the horny cutaneous layer with a lower resistance has been located, the difficulty still remains in deciding whether the point is truly an electrodermic point or not, as sweat glands, endocrine glands, electro-psychomatic refiex, etc. also have a lower resistance than the normal areas of the skin. Therefore, in order to distinguish electrodermic points from other low-resistance areas, it is necessary for use to refer to some other electric factor than resistance, in which electrodermic points differ from both the normal area of the skin and said other low-resistance points. Capacitance is such a factor. The capacitance of normal areas of the horny cutaneous layer is as small as in the order of picofarads, while at an electrodermic point it is as large as in the order of microfarads. Then, by measuring the capacitance as well as resistance of the horny cutaneous layer the electrodermic point may be detected. Prior art instruments, in which only direct current may be used, are not capable of measuring the capacitance.

It is, therefore, an object of the present invention to provide an improved and useful instrument for detecting true electrodermic points on the horny cutaneous layer by measuring variables relating to both the resistance and the capacitance the layer has.

Another object of the invention is to provide such an electric instrument as aforesaid in simple construction, which includes means simulated to the normal area of the horny cutaneous layer, and means for comparing the value of said simulating means and variables of the horny cutaneous layer under exploration.

Still another object of the invention is to provide the foregoing in which when a speaker or headphones are used as a detector, a device is provided to eliminate noise and improve the quality of sound in the detector.

Other objects, advantages and characteristics of the invention will be apparent from the following detailed description of preferred embodiments of the invention with reference to the annexed drawings, wherein.

Figure 1:
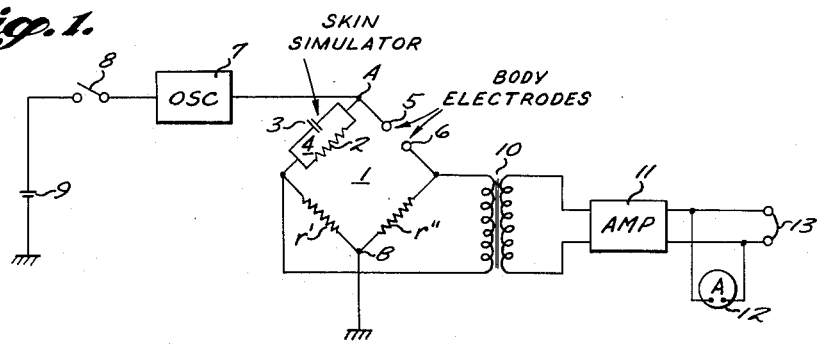
FIG. 1 is a diagram of an embodiment of the invention showing its principles.

Referring now in detail to FIG. 1, a bridge circuit 1 is adapted to compare the impedance of the normal horny cutaneous layer and that of the area or point under exploration. One of the four bridge arms consists of a parallel combination 4 of a resistance 2 and a capacitance 3, simulating the normal horny cutaneous layer. The skin to be examined is connected by means of two electrodes to another arm of the bridge 1 adjacent to said arm consisting of the simulating circuit 4. One of the electrodes is an indifferent or static electrode 5, while the other is a different or explorer electrode 6, as will be described later in detail, and the former electrode is to be removably fixed to a predetermined part of the body wall of the person to be examined, while the latter is slid about over the body wall of the person being examined. The other ratio arms of the bridge circuit 1 are made up of resistances $r'$, $r''$ of the same known value respectively.

An oscillator 7 capable of furnishing a high output frequency of the order of kilocycles is connected to the bridge at the opposite points A and B thereof. The oscillator 7 is supplied with input current from a suitable source 9 through a switch 8. Across the other two opposite points of the bridge is connected the primary of a transformer 10, whose secondary winding is connected through an intervening amplifier 11 to an ammeter 12 and/or headphones or speaker 13.

Figure 2:
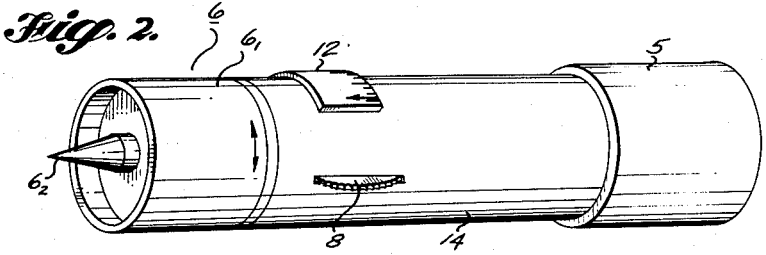
FIG. 2 is a perspective view of one form of the explorer means of the invention, as reduced to practice.

The indifferent electrode 5 is preferably held by the person being examined. FIG. 2 illustrates a device suitable for the person being examined to hold while conducting the examination himself. The device is composed of a hollow cylindrical casing 14 of insulating material and of a shape fitted to be gripped by the hand. In the casing the circuit elements shown in FIG. 1 may be easily contained, if oscillator 7 and amplifier 11 are composed of transistors so as to be rendered of a small size.

The indifferent electrode 5 is provided at one end of the casing 14 in such a manner that when gripped, it may be in close contact with the palm. The explorer electrode 6 is mounted on the other end of the casing. This electrode consists of a roller electrode $6_1$ which is borne rotatably relative to the casing and a needle electrode or probe $6_2$ which has a pointed end.

The combination of these two different types of explorer electrodes is as useful when the examiner and the examined are different persons as it is when they are the same person, and the combination is adapted so that the roller electrode may be used for scanning an area of the body wall within which electrodermic points are to be enclosed, while the probe may be used for accurately locating these points in that area.

In operation, the static electrode is held by the person being examined, while the explorer electrode is slid about over the surface of the skin to be examined. When the switch 8 is closed, the oscillatory 7 is actuated to impress an output current of a predetermined frequency on the bridge 1.

The exploration for electrodermic points may be advantageously conducted in two steps. First, the roller electrode $6_1$ is slid over the body wall to be explored. It is a particular feature of the construction of the explorer electrode that a considerably large area may be covered at one scanning operation of the roller electrode. As described above, the simulating circuit 4 inserted in the bridge arm is so constructed as to have a substantially equivalent value of the normal horny cutaneous layer. Therefore, if the area the roller electrode contacts contains no electrodermic points, the bridge 1 remains in balance, giving a zero indication on the ammeter 12 and/or producing no noise in the headphones or speaker 13. On the contrary, the instant the electrode contacts an electrodermic point, the impedance between this electrode and the indifferent electrode differs from that of the circuit 4, with the result that the bridge 1 is unbalanced and a current flows therethrough and thence through transformer 10 and amplifier 11 to ammeter 12 and/or headphones 13 so as to give an indication corresponding to the value of the flowing current on the former and generate an irregular wave shaped sound in the latter. In the next step, the needle electrode or probe is employed to explore again the area previously scanned by the roller electrode. When the pointed end of the electrode contacts an electrodermic point, a current flows in the bridge circuit, giving an indication corresponding to the value of the current on the ammeter and/or producing a similar sound in the headphones or speaker, just as in the step described above.

Strictly speaking, no two areas or points of the body wall of a person and no two persons' body walls have the same value of impedance, even though they are normal, while the simulating circuit of the instrument, with which these areas or points are to be compared, is designed to have a fixed value. Therefore, it is probable that the bridge becomes unbalanced to cause a current to flow therethrough, even when the explorer electrode is in touch with a normal area or point of the body wall, if the area or point happens to have a different value of impedance from that of the simulating circuit. However, the current which happens to flow when the electrode is in touch with a normal area or point is far less than that of a current which flows when the electrode contacts an electrodermic point, so that the former is considered negligible in practice.

In the circuit arrangement of FIG. 1, one of the bridge arms consist of a circuit simulating the normal horny cutaneous layer with respect to resistance and capacitance, and with alternating current applied, different parts of the body wall can be compared with the simulated circuit 4 in terms of a factor determined relative to both resistance and capacitance. Therefore, unlike prior art instruments of similar kind in which the capacitance was not taken into consideration, the circuits of the present invention can locate electrodermic points quite accurately.

All the circuit elements according to the invention need not be put in the one and same casing 14. For example, in case the examiner and the examined are different persons, the two electrodes 5, 6 may be provided separately from the other elements, and with the indifferent electrode 5 held by the person being examined, the examiner may slide the explorer electrode about over the body wall to be examined.

In the circuit of FIG. 1, the impedances are compared by means of the bridge 1. The comparison may also be made in terms of dielectric loss angle. As mentioned above, electrically the human body wall may be considered a sort of dielectric material, having a resistance and a capacitance. Therefore, when an alternating current is applied to the skin, the capacitance makes the current lead the voltage in phase. The phase difference would ideally be 90°, but actually it is less than 90° by a dielectric loss angle due to the presence of the resistance and capacitance. The dielectric loss angle is thus determined in relation to both capacitance and resistance. Then, through a comparison between the dielectric loss angles of different parts of the horny cutaneous layer to be examined and that of the normal horny cutaneous layer, electrodermic points may be detected. Dielectric power factor or dielectric loss may also be referred to for the same purpose.

It is apparent that the roller electrode contacts a larger area of the body wall than the needle electrode, and that the contact area presents a comparatively high value of capacitance. This will cause errors in the measurement. Then, in order to make measurements with a reliably high degree of accuracy, the effects of this capacitance should be eliminated. Toward this end the circuits shown in FIGS. 3 and 4 are especially directed.

Figure 3:
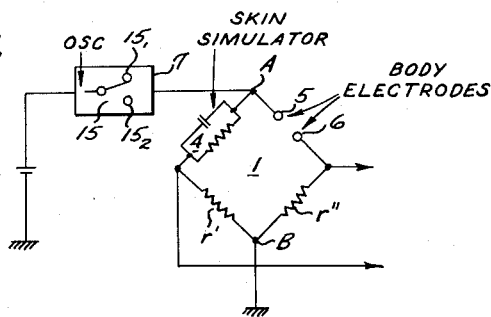
FIG. 3 is a diagram of a portion of another embodiment of the invention which is suitable for a 2-step exploration in which first a comparatively large area of the body wall is scanned and then individual electrodermic points are located within the area.

Referring first to FIG. 3, the arrangement is such that when the roller electrode $6_1$ is used for exploration, an alternating current of such a frequency as renders negligible the capacitance caused by the comparatively large contact area of the body wall with the roller electrode may be applied to the body wall, while when the needle electrode $6_2$ is to be employed, an alternating current having a frequency most suitable for the measurement of the resistance and the capacitance of electrodermic points may be applied. The area or point that can be contacted by the pointed end of the needle electrode is obviously of far lower capacitance. Therefore, it is advisable that the frequency of the alternating current to be applied when the needle electrode is used, should be higher than it is when the roller electrode is employed. To meet this requirement, the oscillator 7 is so constructed that it may furnish alternating current at two different frequencies, with a switch 15 being provided for the purpose of switching the output current from one of the two frequencies to the other. Thus, in the circuit arrangement of FIG. 3, when it is desired to use the roller electrode, the switch is closed at one contact $15_1$ to lead an alternating current of the lower frequency into the bridge circuit, while the probe is used with a current of the higher frequency which may be introduced into the circuit by changing the switch over to the other contact $15_2$. Experiments have disclosed that the most suitable value for the higher frequency is about 10 kc., while that for the lower frequency is less than 1 kc.

Figure 4:
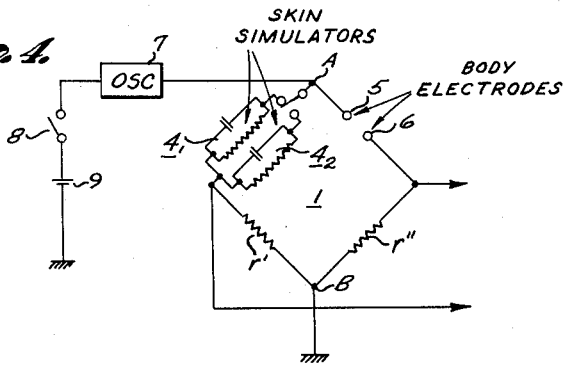
FIG. 4 is similar to FIG. 3 showing a different embodiment.

FIG. 4 illustrates another circuit arrangement designed to eliminate the unwanted effects of the capacitance in the contact area of the body wall with roller electrode. As previously described, the bridge 1 has placed in one of its arms the circuit 4 having a predetermined value of impedance simulated to that of the normal horny cutaneous layer. In the case of the circuit shown in FIG. 4, the single simulating circuit has been replaced by a parallel combination of two simulating circuits $4_1$ and $4_2$, each comprising a parallel combination of a resistance and a capacitance. Circuit $4_1$ is designed to have a predetermined value of impedance simulating that of the normal horny cutaneous layer, the value being determined with due consideration given to the capacitance in the comparatively large contact area of the body wall with the roller electrode. The other circuit $4_2$ is similarly designed, taking into consideration the comparatively small area or point of the body wall to be contacted by the pointed end of the needle electrode, so that the impedance of this circuit may have a value simulated to that of the normal horny cutaneous layer. These two simulating circuits $4_1$ and $4_2$ are placed in parallel in one of the bridge arms in such a manner that they may be selectively switched in or out of the bridge by a switch 16 according to the type of explorer electrode to be used in the operation.

It will be apparent from the above explanation that, with the circuit arrangement as disclosed in FIG. 4, the capacitance at the contact point or area of the body wall with the explorer electrode is rendered negligible. This secures the more accurate detection of electrodermic points.

With the circuit arrangements described heretofore, alternating current is applied. However, in the first step of the exploration wherein the roller electrode is to be employed, better results will be obtained from the use of direct current than from alternating current. This is because, in case the contact area of the body wall with the electrode is relatively large, the capacitance in the contact area has less effect if direct current is used than when alternating current is employed.

Figure 5:
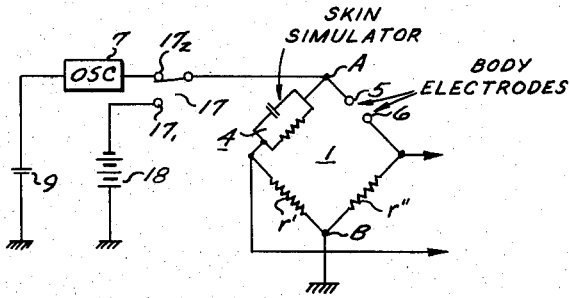
FIG. 5 is a diagram of a part of another embodiment of the invention, in which direct current may be used in the first step of the exploration.

Connections suitable for the use of direct current are shown by way of example in FIG. 5, wherein a D.-C. source 18 is added to the circuit, with a selective switch 17. To describe the connections in more detail, one fixed contact $17_2$ of the switch is connected to the output side of the oscillator 7, while the other contact $17_1$ to one side of the D.-C. source 18, the movable contact of the switch being connected to the point A of the bridge circuit 1. Thus, the two current sources may be selectively switched in and out of the circuit.

With this arrangement, the exploration of electrodermic points is conducted in two steps, just as with circuits described above with reference to FIGS. 3 and 4. In the first step, the switch is closed at the contact $17_1$ and the explorer electrode is slid over the area to be examined. It is needless to say that the roller electrode is used for this purpose. When the electrode contacts an electrodermic point, the bridge becomes unbalanced to cause a current to flow therethrough. The next step is to locate the electrodermic point definitely within the area scanned by the roller electrode in the previous step of exploration. To this end, with the switch 17 having been closed at the contact $17_2$ to supply an alternating current to the bridge current 1, the needle electrode is applied to the body wall point by point to search the area previously defined by the roller electrode for points where the bridge becomes unbalanced.

As described heretofore, the circuits of the invention may be provided with headphones or speaker so that some sound may be heard therein when an electrodermic point is contacted by the explorer electrode to unbalance the bridge. Even when the electrode is in contact with the normal area of the body wall, some noise is heard in the headphones. This noise is caused by the difference between the predetermined impedance of the simulating circuit 4 and the actual impedance of the normal horny cutaneous layer the electrode contacts. The noise may be easily distinguished from the type of sound to be heard when electrodermic points are contacted, but a continuous noise in the headphones or speaker is undoubtedly bothersome and unpleasant to the persons concerned. It may therefore be preferable to reduce the noise or eliminate it completely.

Figure 6:
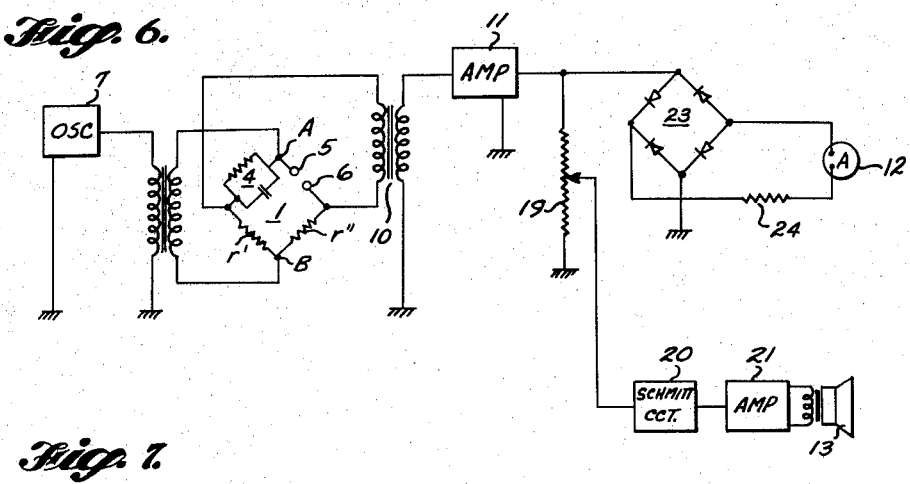
FIG. 6 is a diagram of a complete circuit of the invention, as reduced to practice, including a circuit for eliminating noise and improving the tone of the detector.

FIG. 6 illustrates by way of example a modified embodiment of the invention suitable to shut off such noise. As shown in the figure, the output voltage of the amplifier 11 is supplied through a variable resistor 19 to a Schmitt circuit 20, where the applied voltage has both its wave tails cut off so that the output wave will be of a square shape. If the operating voltage of the circuit 20 is preset to a value a little higher than those of the noise voltages expected to occur, the circuit will act also as a limiter to eliminate all the noise voltages. The output of the circuit 20 is then applied through an amplifier 21 to the headphones or speaker 13, in which no sound will be heard so long as the explorer electrode is in contact with the normal horny cutaneous layer. Moreover, the output square waves of the Schmitt circuit have an equal amplitude. This will assure a good quality of the sound produced in the phones. The circuit further includes a transformer 10' interposed between the oscillator 7 and the comparison circuit 1, and a four-diode full-wave rectifier 23 at the output so that unidirectional current is supplied to ammeter 12 through resistor 24.

Figure 7:
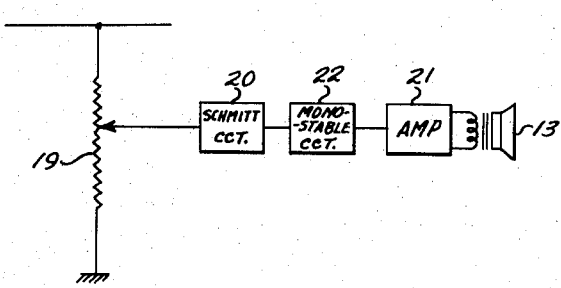
FIG. 7 is a diagram of an improved modification of part of FIG. 6.

In the modification illustrated in FIG. 7, a monostable circuit 22 is inserted between the Schmitt circuit and the amplifier 21. The pulse width of the output from the monostable circuit will then become constant, so that the headphones will be supplied with pulses of an equal amplitude and width, with the result that the sound produced has a constant musical interval.

It will be apparent that the present invention has overcome all the difficulties and disadvantages which resulted from the use of direct current in the prior art, and provided an improved diagnostic instrument for locating electrodermic points with a very high degree of accuracy. It should be recognized that the embodiment disclosed herein are merely representative and that further modifications and changes may be made. For example, the simulating circuit consisting of a parallel combination of a resistor and a condenser can be replaced by a normal area of the horny cutaneous layer itself.

What is claimed is:

1. An instrument for locating particular cutaneous points caused by viscero-vascular reflex, including a resistance-capacitance circuit simulating the impedance of the skin, a static electrode to be removably fixed to a portion of the body wall of the person to be examined, an explorer electrode to be moved over said body wall and including a probe adapted to contact minute cutaneous points, a comparing circuit coupled with said simulating circuit and said electrodes for comparing instantaneously the impedance of said simulating circuit and the impedance between said two electrodes, means coupled with said comparing circuit for indicating the results of said comparison, and an alternating current source coupled with said two electrodes for supplying current to said two electrodes to apply said current to said body wall.

2. The instrument of claim 1, wherein said explorer electrode is composed of a roller electrode and a needle electrode, and said A.-C. source includes separate outputs furnishing current of high and low frequency, respectively, and coordinative means for utilizing said low frequency current when said roller electrode is used and said high frequency current when said needle electrode is used.

3. An instrument for locating particular cutaneous points caused by viscero-vascular reflex, comprising a resistance-capacitance circuit simulating the impedance of the skin, a static electrode to be removably fixed to a portion of the skin of the person to be examined, an explorer electrode including a roller element for scanning the surface of the skin and a probe for examining minute points thereon, a direct current source for applying direct current to the skin through said electrodes when utilizing said roller element for scanning, an alternating current source for applying alternating current to the skin through said two electrodes when utilizing said probe for examining minute points within the area scanned, and circuit means for comparing instantaneously the impedance of said simulating circuit and the skin impedance between said electrodes, including means for indicating results of said comparison.

4. The instrument of claim 3, wherein said comparing circuit means comprises a bridge circuit, one arm of which includes resistance and capacitance elements in parallel constituting said simulating circuit, and an adjacent arm of which includes said electrodes, whereby during examination said bridge circuit is adapted instantaneously to compare the impedances of the skin and said simulating circuit.

5. The instrument of claim 4, wherein said one bridge circuit arm comprises separate such resistance-capacitance simulator circuits adapted to be connected therein, said circuit having skin-simulating impedance values corresponding respectively to the capacitance caused by the comparatively large contact area of the skin with the roller electrode and to the capacitance caused by the comparatively small contact area or point of the skin with the needle electrode, and means rendering said two impedance circuits selectively connectable in said bridge circuit arm according to the type of explorer electrode to be employed.

6. An instrument for locating particular cutaneous points caused by viscero-vascular reflex, comprising a circuit simulating the normal horny cutaneous layer, an indifferent or static electrode to be removably fixed to a portion of the body wall of the person to be examined, a different or explorer electrode to be moved over said body wall, means for comparing the dielectric loss angle caused by the normal body wall and a dielectric loss angle caused between said two electrodes, means for indicating the results of said comparison, and an alternating current source for supplying current to said two electrodes to apply said current to said body wall.

References Cited by the Examiner

UNITED STATES PATENTS

| | | | |
|---|---|---|---|
| 2,111,135 | 3/38 | Bagno | 128—2.1 |
| 2,298,506 | 10/42 | Parker | 128—2.1 |
| 2,535,249 | 12/50 | Wilhelm | 128—2.1 |
| 2,704,539 | 3/55 | Fisher | 128—2 |
| 2,728,337 | 12/55 | Guillemin | 128—2 |
| 2,866,461 | 12/58 | Suzuki | 128—419 |
| 3,064,641 | 11/62 | Manenti | 128—2.1 |
| 3,051,896 | 8/62 | Bieganski | 128—2.1 X |
| 3,128,759 | 4/64 | Bellis | 128—2.1 |

RICHARD A. GAUDET, *Primary Examiner.*

JORDAN FRANKLIN, *Examiner.*